(12) United States Patent
Saund et al.

(10) Patent No.: US 9,082,118 B2
(45) Date of Patent: Jul. 14, 2015

(54) TRANSACTION FLOW CONTROL USING CREDIT AND TOKEN MANAGEMENT

(71) Applicant: Apple Inc., Cupertino, CA (US)

(72) Inventors: Gurjeet S. Saund, Saratoga, CA (US); Munetoshi Fukami, Newark, CA (US); Kevin C. Wong, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 13/944,462

(22) Filed: Jul. 17, 2013

(65) Prior Publication Data

US 2015/0026041 A1  Jan. 22, 2015

(51) Int. Cl.
*G06F 17/50* (2006.01)
*G06Q 20/38* (2012.01)
*G06Q 20/24* (2012.01)

(52) U.S. Cl.
CPC ............ *G06Q 20/38* (2013.01); *G06F 17/5045* (2013.01); *G06Q 20/24* (2013.01); *G06F 17/505* (2013.01)

(58) Field of Classification Search
None
See application file for complete search history.

(56) References Cited

U.S. PATENT DOCUMENTS

| | | | |
|---|---|---|---|
| 6,337,865 B1 * | 1/2002 | Seto et al. | 370/450 |
| 6,760,793 B2 * | 7/2004 | Kelley et al. | 710/52 |
| 7,136,954 B2 | 11/2006 | Check et al. | |
| 7,840,737 B2 | 11/2010 | Tsunoda | |
| 8,045,472 B2 | 10/2011 | Wang et al. | |

* cited by examiner

*Primary Examiner* — Leigh Garbowski
(74) *Attorney, Agent, or Firm* — Meyertons, Hood, Kivlin, Kowert and Goetzel, P.C.

(57) ABSTRACT

Embodiments of a local interface unit are disclosed that may allow for managing credits and tokens as part of flow control method. The local interface unit may include a transmit unit and a receive unit. The transmit unit may be configured to receive credits and tokens, determine an available number of credits based on the number received tokens, determine an available number of tokens based on the number of received tokens, and send the available credits to an arbitration unit. The available credits may then be updated, by the transmit unit in response to receiving a selected transaction from the arbitration, and the transmit unit may then transmit the selected transaction, and update the available credits and the available tokens once the transaction has been sent. The receive unit may be configured to send credits and tokens to a transmit unit, and receive a transaction sent by a transmit unit.

17 Claims, 7 Drawing Sheets ized circuit. With numerous functions included in a single integrated circuit, chip count may be kept low in mobile computing systems, such as tablets, for example, which may result in reduced assembly costs, and a smaller form factor for such mobile computing systems.

TRANSACTION FLOW CONTROL USING CREDIT AND TOKEN MANAGEMENT

BACKGROUND

1. Technical Field

This invention is related to the field of integrated circuit implementation, and more particularly to the implementation transaction flow control techniques.

2. Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Each functional block included within an SoC may be designed in accordance to one of various design flows. The logical operation of some functional blocks may be described in a high-level computer language such as, e.g., Very-high-speed integrated circuit hardware description language (VHDL). Logic gate implementations of blocks described in such a fashion may be generated using logic synthesis and place-and-route design techniques. Other functional blocks, such as memories, phase-locked loops (PLLs), analog-to-digital converters (ADCs), may be designed in a full-custom fashion.

Functional blocks within an SoC may be connected to one another through a bus. Such busses may employ proprietary communications protocols or they may employ industry-standard communication protocols, such as, Peripheral Component Interconnect Express (PCIe®), for example. Some SoC implementations may allow for multiple communication protocols to be employed between the various functional blocks included within the SoC. The transfer of transactions, i.e., requests and responses, may be sent over a communication bus. In some designs, flow control techniques may be employed to limit or prevent stall situations from occurring during the transfer of transactions.

In some SoC designs, multiple clock signals may be employed allowing different functional blocks within an SoC to operate at different frequencies, and allowing clock signals to be stopped for a given functional block when the block's functionality is not required. Asynchronous first in first out (FIFO) buffers or registers may be employed in some designs to aid in the transfer of transactions between two functional blocks operating at two different clock frequencies.

SUMMARY OF THE EMBODIMENTS

Various embodiments of a link interface unit are disclosed. Broadly speaking, a circuit and a method are contemplated in which a transmit unit and a receive unit are coupled to a communication bus. The transmit unit may be configured to receive credits and tokens from a destination receive unit, determine available credits dependent upon the received credits and tokens, and determine available tokens dependent upon the received tokens. The transmit unit may be further configured to send the available credits to an arbitration circuit, update the available credits responsive to receiving a selected transaction from the arbitration circuit, transmit the selected transaction, and update the available credits and the available tokens in response to the transmission of the selected transaction. The receive unit may be configured to send credits and tokens to a source transmit unit, and receive a transaction sent by the source transmit unit.

In another embodiment, the transmit unit may include an asynchronous register configured to receive the credits. In a further embodiment, the transmit unit may further include another asynchronous register configured to store the tokens.

In another non-limiting embodiment, the transmit unit may include an asynchronous register configured to store received transactions. In further embodiment, the receive unit may include one or more buffer circuits. Each of the buffer circuits may be configured to store received transactions.

BRIEF DESCRIPTION OF THE DRAWINGS

The following detailed description makes reference to the accompanying drawings, which are now briefly described.

Figure 1:
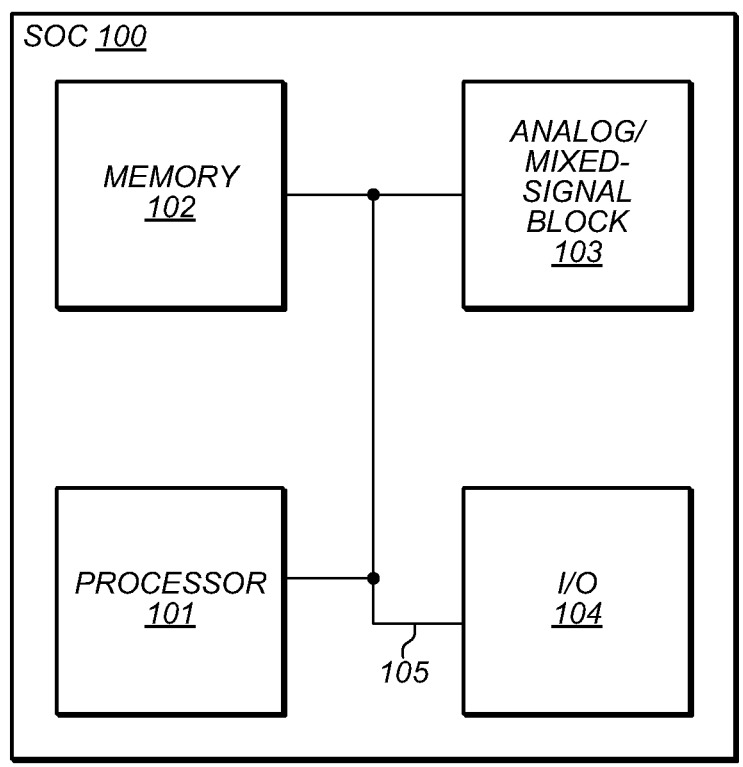
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Some functional blocks may be designed using a full-custom design methodology, while other functional blocks may be implemented using logic synthesis and place-and-route. In some embodiments, some functional blocks may be re-used from a previous SoC design, while other may be designed for a specific task for a given SoC. Other functional blocks may be purchased from third party vendors for inclusion in an SoC design.

To implement an SoC, the various included functional blocks may be designed to communicate with one another. In some embodiments, the communication may be a point-to-point bus, which may allow two or more functional blocks to communicate with each other. Some embodiments, however, may include functional blocks whose functionality is shared by amongst the other functional blocks included on the SoC. To accommodate the sharing of functional blocks, a common communication bus may be employed.

In some embodiments, a common communication bus (also referred to herein as a "physical link") may employ one of various communication protocols to arbitrate requests and responses from various functional blocks coupled to the communication bus. In some embodiments, the communication protocols may be proprietary in nature while, in other embodiments, the communication protocols may conform to one of various industry standard communication protocols.

In various embodiments, flow control may be employed to prevent a stall situation on a communication bus. The flow control may employ the used of credits, where a credit represents a single packet of information. A functional block may not send a transaction unless the destination block has sufficient credits to receive the anticipate number of packets. In some embodiments, different virtual channels may employ different credits, allowing flow control on a per virtual channel basis.

In other embodiments, different functional blocks within an SoC may operate at different clock frequencies (also referred to as being in different "clock domains"). In such circumstances, an additional level of flow control using tokens may be employed. A token may, in various embodiments, represent a free entry in an asynchronous FIFO buffer or register of a destination block. Tokens may be maintained for a single physical link that may include one or more virtual channels. Credits and tokens may be used together to improve communication throughput between functional blocks operating at different clock frequencies. For example, it may be possible to oversubscribe the communication over a physical link when employing only credit management. In some embodiments, the use of tokens in addition to credits may prevent the oversubscription. The embodiments illustrated in the drawings and described below may provide techniques to manage communication traffic between functional blocks within an SoC.

System-on-a-chip Overview

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include one or more register files and memories.

In some embodiments, processor 101 may implement any suitable instruction set architecture (ISA), such as, e.g., the PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, or a Ferroelectric Random Access Memory (FeRAM), for example. In some embodiments, memory block 102 may be configured to store program code or program instructions that may be executed by processor 101. Memory block 102 may, in other embodiments, be configured to store data to be processed, such as graphics data, for example.

It is noted that in the embodiment of an SoC illustrated in FIG. 1, a single memory block is depicted. In other embodiments, any suitable number of memory blocks and memory types may be employed.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In other embodiments, analog/mixed-signal block 103 may be configured to perform power management tasks with the inclusion of on-chip power supplies, voltage regulators, and clock frequency scaling circuitry. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol or IEEE 1394 (Firewire®) protocol, and may allow for program code and/or program instructions to be transferred from a peripheral storage device for execution by processor 101.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Figure 2:
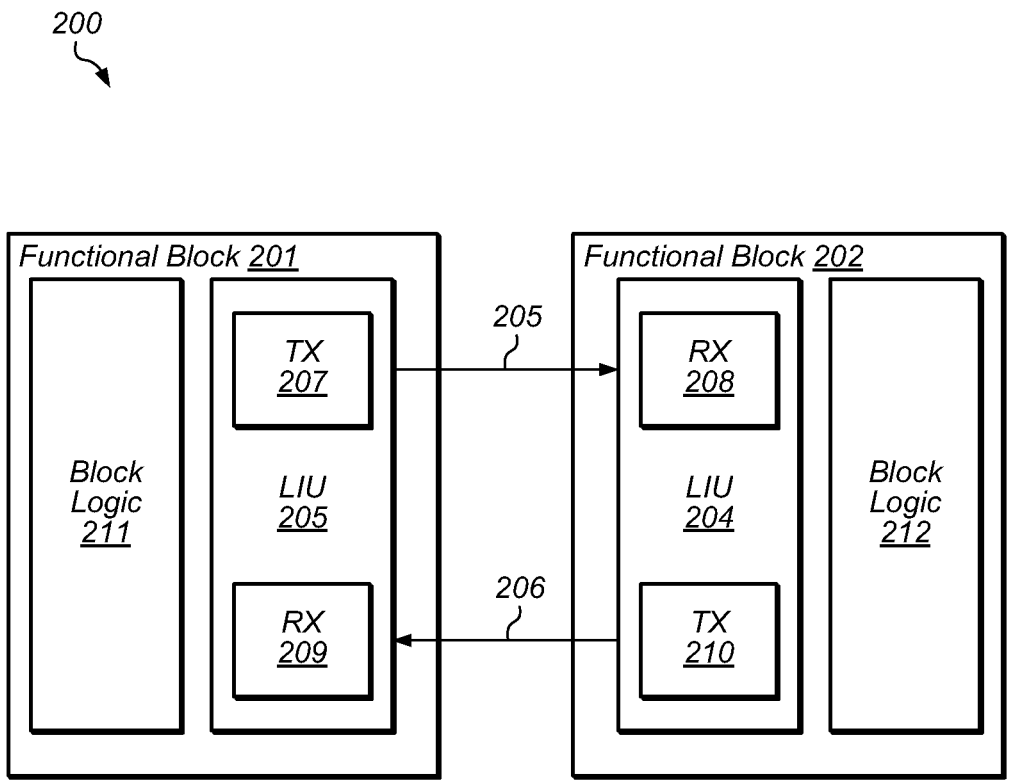
FIG. 2 illustrates another embodiment of system-on-a-chip.

Turing to FIG. 2, another embodiment of an SoC is illustrated. In the illustrated embodiments, SoC 200 includes functional block 201 and functional block 202. In some embodiments, each of functional blocks 201 and 202 may correspond to one of blocks 101 through 104 as depicted in SoC 100 as illustrated in FIG. 1. Functional block 201 is coupled to functional block 202 through bus 205 and bus 206.

Functional blocks of an SoC may communicate with other functional blocks by sending commands and data (collectively referred to as "transactions") over a bus, such as bus 205 and bus 206. Such transaction may include, without limitation, read and write memory requests, and read and write peripheral input/output (PIO). A functional block may be configured as a master device or a slave device on the bus. A master device may be configured to initiate a transaction on the bus, while a slave device may be configured to only respond to requests. In some embodiments, there may be more than one device configured as a master connected to a bus.

Transactions on a bus, such as, e.g., bus 205 and bus 206, may be encoded by one of various communication protocols. For example, transactions may be encoded using an industry standard communication protocol, or a proprietary communication protocol. In some embodiments, different busses within an SoC may employ different communication protocols. Although SoC 200 shows two busses, it is noted that in other embodiments, additional busses with various communication protocols may be employed.

Bus 205 and bus 206 may, in some embodiments, include one or more virtual channels. The virtual channels may be used to control the flow of data on each of the busses. In some embodiments, each virtual channel may be uni-directional, i.e., only allowing communication between functional blocks in a single direction. Each virtual channel may employ one or more quality-of-service (QoS) levels. In some embodiment, each QoS level may correspond to a level of priority in which data packets are sent.

Functional block 201 includes block logic 211 and link interface unit (LIU) 203. In some embodiments, block logic 211 may include a processor, memory, or any suitable circuit that may be required by SoC 200. LIU 203 includes a transmit unit 207 and receive unit 209. In a similar fashion, functional block 202 includes block logic 212 and LIU 204. In some embodiments, block logic 212 may include a processor, memory, or any other suitable circuit. LIU 204 includes receive unit 208 and transmit unit 210. Functional blocks 201 and 202 may, in various embodiments, be operating at different clock frequencies, and each of functional blocks 201 and 202 may include one or more asynchronous first in first out (FIFO) registers or buffers configured to receive data at a clock frequency different than the block's operating frequency.

FIFOs, as described herein, may include rows of one or more latches coupled together and configured to sequentially transfer data through the row of latches. A static random access memory (SRAM) may, in other embodiments, be employed to implement FIFO buffer 805 along with circuitry configured to maintain separate read and write pointers for indexing into the SRAM.

In various embodiments, transmit units 207 and 210 may be configured to send commands and data to LIU receive unit of another function block, such as, e.g., receive unit 208 and receive unit 209, respectively. Transmit units 207 and 210 may be further configured to receive credits and tokens from receive units of the other functional blocks. The received credits and tokens may be used by transmit units 207 and 210 to control the transmission of the commands and data to their respective receive destinations, and may be returned to their source receive unit upon successful sending of a command or data. In some embodiments, separate credits and tokens may be employed for each virtual channel of a bus.

In some embodiments, receive units 208 and 209 may be configured to receive commands and data from LIU transmit units of other functional blocks, such as, e.g., transmit unit 207 and transmit unit 210, respectively. Receive units 208 and 209 may, in other embodiments, be configured to send credits and tokens to transmit units. The credits and tokens may be indicative of the number of available entries in each receive unit that are capable of storing all or part of a command or data.

It is noted that the SoC illustrated in FIG. 2 is merely an example. In other embodiments, different numbers of functional blocks, and different configurations of functional blocks are possible and contemplated.

Link Interface Units and Flow Control

Figure 3:
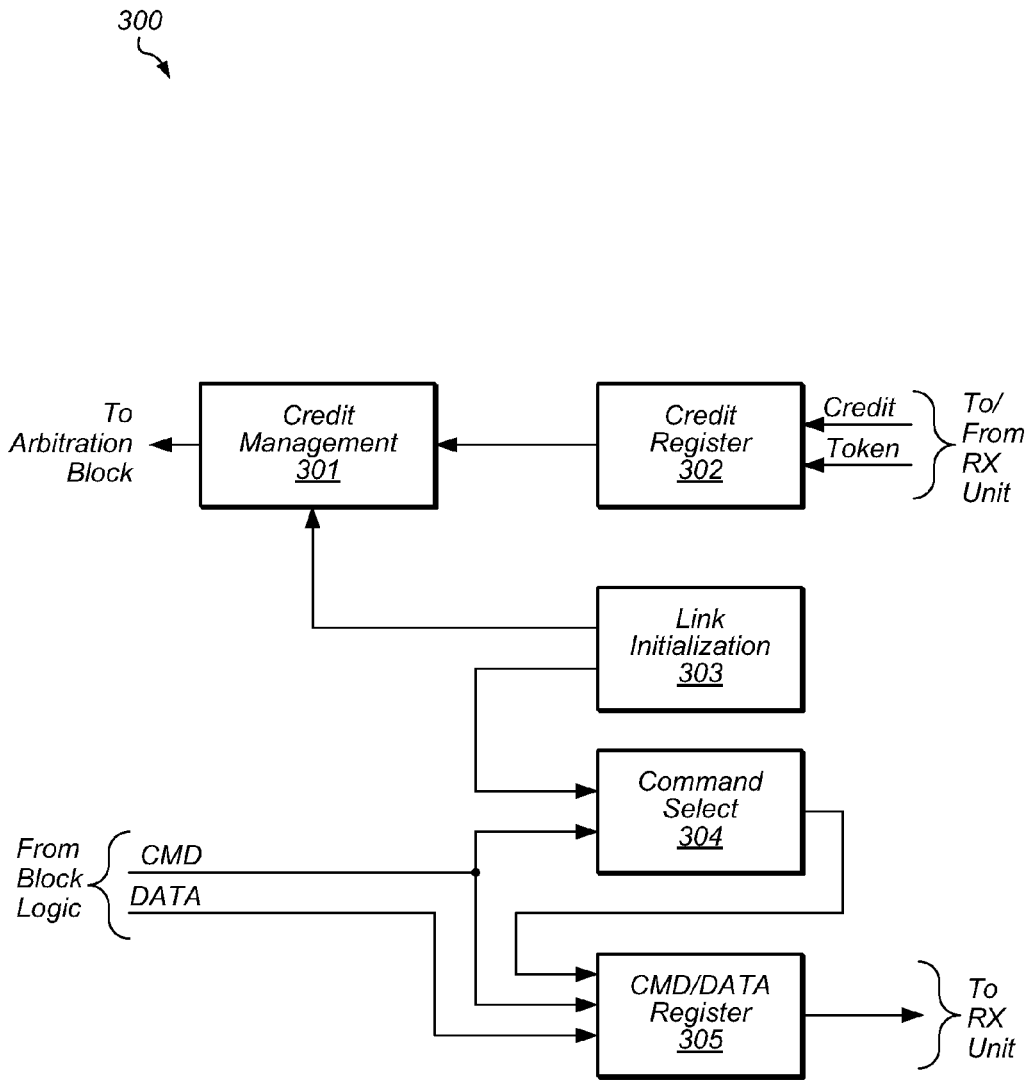
FIG. 3 illustrates an embodiment of a link interface unit transmit unit.

An embodiment of a transmit unit is illustrated in FIG. 3. Transmit unit 300 may, in some embodiments, correspond to transmit unit 207 or transmit unit 210 as depicted in FIG. 2. In the illustrated embodiment, transmit unit 300 includes credit management unit 301, credit register 302, link initialization circuit 303, command select circuit 304, and command data register 305.

Credit management unit 301 is coupled credit register 302 and link initialization circuit 303, as well as to external arbitration logic. In various embodiments, credit management unit 301 may be configured to track the number of credits and tokens necessary to allow the sending of transactions (i.e., commands and data) to a destination receiver unit. Credit management unit 301 may include one or more counters configured to increment or decrement in response to the receipt of a credit or token, or the sending of a command or data packet, respectively. Each counter may, in some embodiments, be configured to reset to a pre-determined initial value in response to a reset signal from link initialization circuit 303.

In some embodiments, credit management unit 301 may be configured to send a number of available credits to arbitration logic within a functional block such as, functional block 201, as illustrated in FIG. 2. Credit management unit 301 may, in various embodiments, employ different credits for command and data, thereby allowing independent flow control for commands and data. The number of available credits may be modified by credit management unit 301 dependent upon a number tokens. For example, in some embodiments, the number of command credits and data credits may be independently reduced when the number of tokens reaches a pre-determined value. In some embodiments, the number of available command credits may be reduced to zero, while the number of data credits may be reduced to a minimum level.

Credit register 302 may, in various embodiments, be configured to store a number of credits and/or tokens. In some embodiments, credit register 302 may be configured to receive credits and tokens from a receive unit such as, e.g., receive unit 208 as depicted in FIG. 2. The received credits and tokens may be transmitted to credit register 302 via a bus dedicated for the transmission of credits and tokens within an SoC. In some embodiments, credit register 302 may be an asynchronous register allowing credits and tokens to be stored at one clock frequency, and retrieved from storage at a different clock frequency.

Registers as described herein may be designed according to one of various design styles. Registers may include one or data storage circuits configured to store data bits. In some embodiments, the data storage circuits may have multiple data ports allowing simultaneous read and write access the data storage circuits. In some embodiments, the registers may be implements using static complementary metal-oxide semiconductor (CMOS) logic gates, while, in other embodiments, dynamic circuit techniques may be employed.

Command data register 305 may be configured to received commands and data from block logic such as, e.g., block logic 211 as illustrated in FIG. 2, and temporarily stored the command and data before transmitting the information onto a destination receive unit via a communication bus, such as bus 205 as depicted in FIG. 2. In some embodiments, command data register 305 may be asynchronous allowing commands and data to be stored at one clock frequency and transmitted to the destination receive unit at a different clock frequency.

Command select circuit 304 may be configured to select from multiple transaction sources to provide input to command data register 305. In some embodiments, the transaction sources may include link initialization commands, commands from the agent, and no operation commands (commonly referred to as "NOP commands"). One or more multiplex circuits may, in various embodiments, be included in command select circuit 304 to perform the selection function.

Multiplex circuits, such as those describe herein, may be constructed in accordance with one of various design styles. For example, in some embodiments, multiplex circuits may include a plurality of tri-state buffers whose outputs are coupled together in a wired-OR fashion, and whose control inputs are dependent upon one of the selection inputs (not shown). In other embodiments, multiplex circuits 406 through 408 may include a plurality of logic gates configured to implement the desired multiplex.

It is noted that transmit unit 300 as illustrated in FIG. 3 is merely an example. In other embodiments, different circuit blocks and different configurations of circuit blocks are possible and contemplated.

Figure 4:
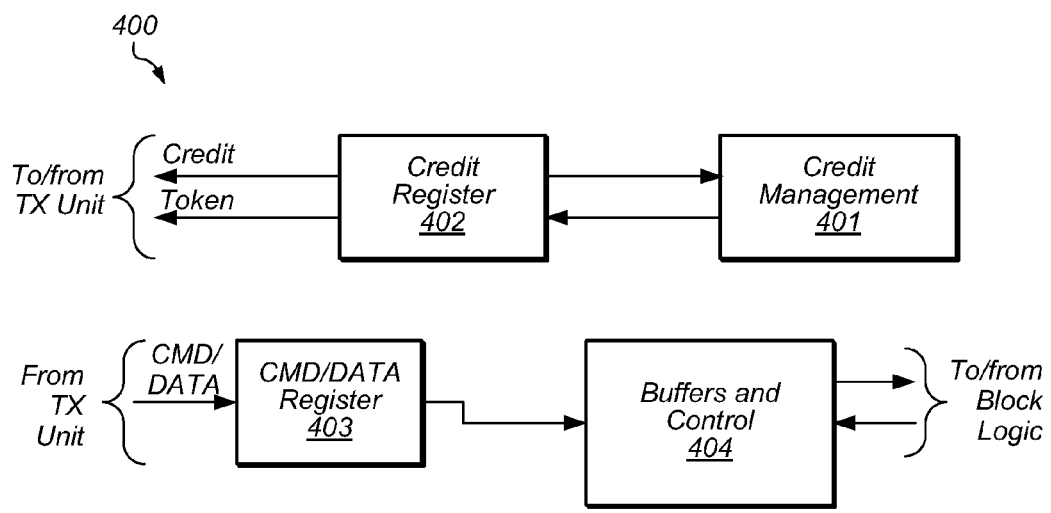
FIG. 4 illustrates an embodiment of a link interface unit receive unit.

Turning to FIG. 4, an embodiment of a receive unit is illustrated. Receive unit 400 may, in various embodiments, correspond to either receive unit 208 or receive unit 209 as depicted in FIG. 2. In the illustrated embodiment, receive unit 400 may include credit management unit 401, credit register 402, command and data register 403, and buffers and control unit 404.

Credit management unit 401 may, in various embodiments, be configured to store a number of credits and/or tokens. In some embodiments, the number of credits may correspond to a number of available entries in a buffer included in buffers and control unit 404. The number of tokens may correspond to a number of available entries in command data register 403. In some embodiments, credit management unit 401 may include one or more counter circuits each of which may be configured to increment or decrement responsive to the return of a credit or token from a transmit unit or the sending of a credit or token to a transmit unit. In other embodiments, separate counts of credits and tokens may be maintained for each virtual channel of a communication bus.

In some embodiments, credit register 402 may be configured to store a number of credits and/or tokens. Credit register 402 may, in various embodiments, be configured to send credits and tokens to a transmit unit such as, e.g., transmit unit 207 or transmit unit 210 as depicted in FIG. 2. In some embodiments, credit register 402 may an asynchronous register allowing credits and tokens to be stored in the register from credit management unit 401 at one clock frequency, and transmitting the stored credits and tokens to a transmit unit at another clock frequency.

Command and data register 403 may, in some embodiments, be configured to receive commands and data from a transmit unit, such as transmit unit 207 or transmit unit 210 as depicted in FIG. 2, via a communication bus, and temporarily store the received commands and data before sending them to buffer and control unit 404. In some embodiments, command and data register 403 may be an asynchronous register allowing commands and data to be received from the communication bus at one clock frequency, and the sending of the received commands and data to buffer and control unit 404 at a different frequency.

In some embodiments, buffers and control unit 404 may include buffers configured to separately store command and data before sending the stored commands and data to block logic such as, block logic 211 as depicted in FIG. 2, for example. Each buffer may be designed in accordance with one of various design styles including register file, SRAM, or any other suitable circuit. Buffers and control unit 404 may, in other embodiments, also include circuits configured perform pre-processing on commands and to track QoS information for the received commands.

It is noted that the embodiment illustrated in FIG. 4 is merely an example. In other embodiments, receive unit 400 may employ different blocks and/or different configurations of blocks.

Figure 5A:
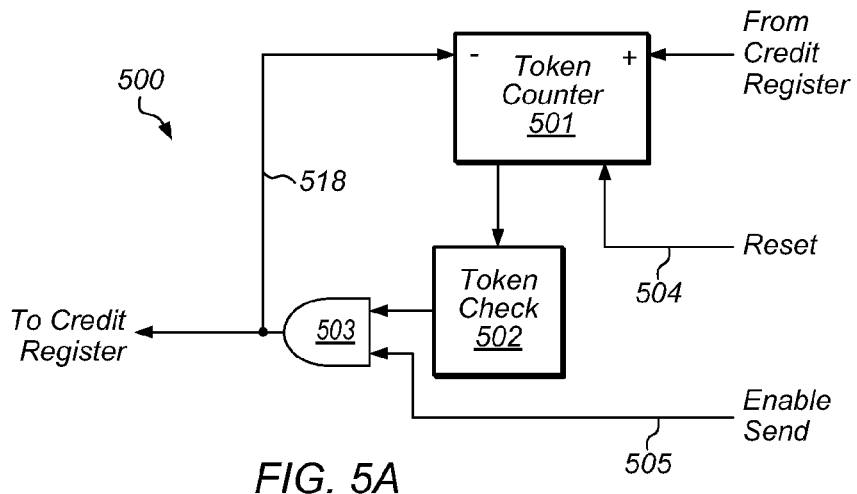
FIG. 5A illustrates an embodiment token management circuit.

An embodiment of a token management circuit is illustrated in FIG. 5A. Token management circuit 500 may, in some embodiments, be included as part of credit management unit 401 as illustrated in FIG. 4. In the illustrated embodiment, token management circuit 500 includes token counter 501, token check unit 502, and AND gate 503.

In some embodiments, token counter 501 may be configured to increment in response to receiving a token from a credit register such as, e.g., credit register 402 as illustrated in FIG. 4. Token counter 501 may be further configured to decrement in response to the assertion of token valid signal 518 which may, in various embodiments, correspond to a the transmission of a token to a transmit unit, such as transmit unit 207 as depicted in FIG. 2, for example. In other embodiments, token counter 501 may be set to a pre-determined value, such as, e.g., zero, by the assertion of reset signals 504.

Counters as described herein, may be a sequential logic circuit configured to cycle through a pre-determined set of logic states. A counter may include one or more state elements such as, e.g., flip-flop circuits, and may be designed according to one of various designs styles including asynchronous (ripple counters), synchronous counters, ring counters, and the like.

Token check circuit 502 may be configured, in some embodiments, to compare the output of token counter 501 to a pre-determined value, such as, zero, for example. In various embodiments, token check circuit 502 may include a digital comparison circuit which may include one or more exclusive-OR (XOR) logic gates. AND gate 503 may be configured to logically combine the output token check circuit 502 with enable send signal 505 to generate token valid signal 518, which may be sent to a credit register, such as credit register 402 as illustrated in FIG. 4, for example.

Static AND gates, such as those shown and described herein, may be implemented according to several design styles. For example, an AND gate may be implemented as a NAND gate whose output is coupled to an inverter. In other embodiments, an AND gate may be constructed from multiple NAND gates, multiple NOR gates, or any suitable combination of logic gates. In a similar fashion, static OR gates, such as those shown and described herein, may also be implemented according to several design styles. For example, an OR gate may be implemented as a NOR gate whose output is coupled to an inverter, or another suitable combination of logic gates.

It is noted that the embodiment illustrated in FIG. 5A is merely an example. In other embodiments, different circuit blocks with different functionality may be employed.

Figure 5B:
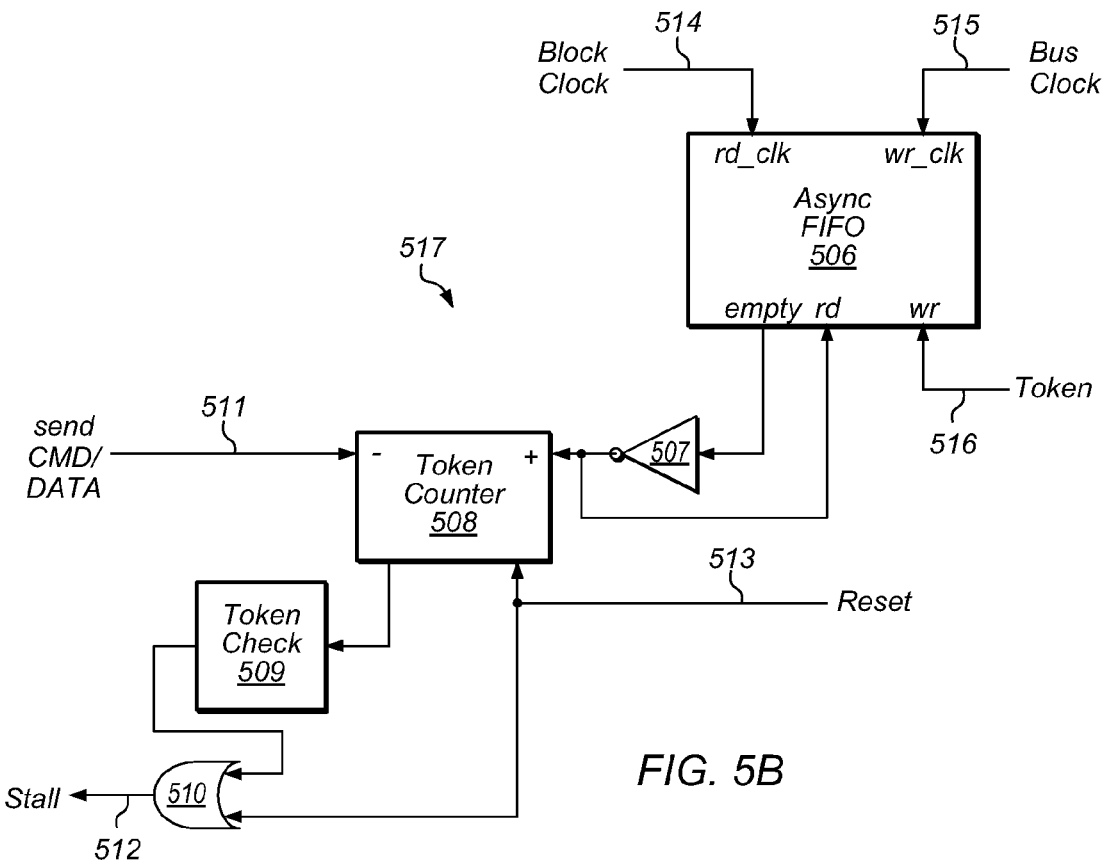
FIG. 5B illustrates another embodiment of a token management circuit.

Another embodiment of a token management circuit is illustrated in FIG. 5B. Token management circuit 517 may, in some embodiments, be included as part of credit management unit 301. In the illustrated embodiment, token management circuit 517 includes asynchronous FIFO 506, inverter 507, token counter 508, token check circuit 509, and OR gate 510.

Asynchronous FIFO 506 may be configured, in some embodiments, to store token 516 from a communication bus in response to the assertion of bus clock 515. In other embodiments, asynchronous FIFO 506 may be configured determine when no tokens are stored and assert the signal on its empty port in response to the assertion of block clock 514. In various embodiments, bus clock 515 and block clock 514 may have different frequencies. The input of inverter 507 is coupled to the empty port of asynchronous FIFO 506, and the output of inverter 507 is coupled to the read port of asynchronous FIFO 506.

It is noted that static complementary metal-oxide semiconductor (CMOS) inverters, such as those shown and described herein, may be particular embodiments of inverting amplifiers that may be employed in the circuits described herein. However, in other embodiments, any suitable configuration of inverting amplifier that is capable of inverting the logical sense of a signal(s) and performing logical work may be used including inverting amplifiers built using technology other than CMOS.

In some embodiments, token counter 508 may be configured to increment in response to the assertion of the output of inverter 507. Token counter 508 may be further configured to decrement in response to the assertion of send command data signal. In other embodiments, token counter 508 may be set to a pre-determined value, such as, e.g., zero, by the assertion of reset signal 513.

Token check circuit 509 may be configured, in some embodiments, to compare the output of token counter 508 to a pre-determined value, such as, zero, for example. In various embodiments, token check circuit 509 may include a digital comparison circuit which may include one or more exclusive-OR (XOR) logic gates. OR gate 510 may be configured to logically combine the output token check circuit 509 with enable reset signal 513 to generate stall signal 512, which may be sent to arbitration logic within block logic, such as block logic 211 as illustrated in FIG. 2, for example.

In some embodiments, employing a token management circuit such as, e.g., token management circuit 517 as illustrated in FIG. 5, may prevent the oversubscription (i.e., multiple functional blocks attempting to send commands and data to a single destination) of a physical link. It is noted that the embodiment illustrated in FIG. 5B is merely an example. In other embodiments, different circuit block and different configurations of circuit blocks are possible and contemplated.

Figure 6:
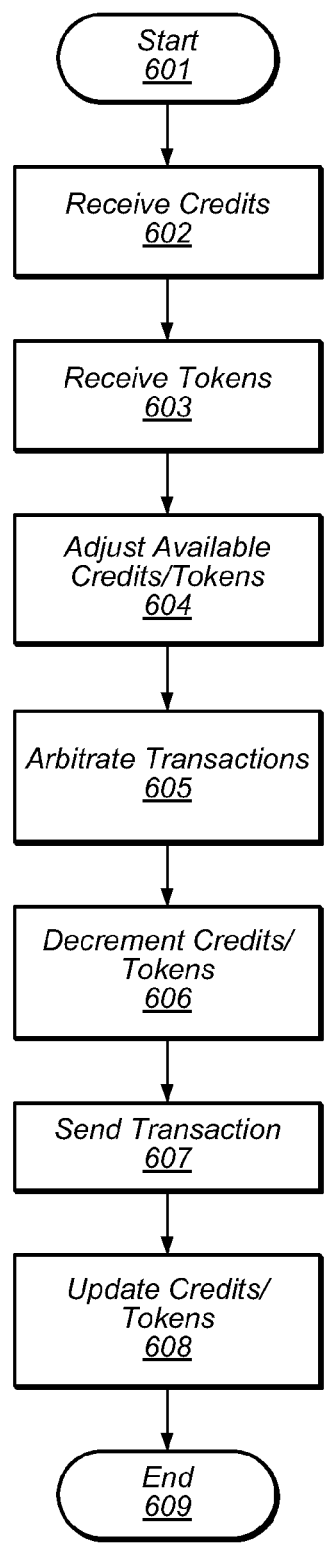
FIG. 6 illustrates a flowchart of an embodiment of a method for flow control in an SoC.

Turning to FIG. 6, a flowchart of an embodiment of a method for performing flow control in an SoC is illustrated. The method begins in block 601. Credits may then be received by a transmit unit such as, e.g., transmit unit 207 as illustrated in FIG. 2 (block 602). The credits may be received from a receive unit such as, e.g., receive unit 208 as illustrated in FIG.2, and the received credits may be indicative of a number of packets (either command or data) that the receive unit is currently capable of storing in an virtual channel buffer, such as, e.g., buffer and control unit 404 as illustrated in FIG. 4. The credits may be received via a multi-purpose communication bus which supports various command and data transactions. In other embodiments, the credits may be received via a dedicated bus specifically intended to convey credit related communication traffic.

The transmit unit may then receive tokens from the receive unit (block 603). The tokens may, in various embodiments, represent an empty entry in an asynchronous FIFO buffer or register in the receive unit. In some embodiments, a counter may be incremented in the credit management unit of a transmit unit such as, e.g., credit management unit 301 as illustrated in FIG. 3, in response to receiving a token. The tokens may, in other embodiments, be exchanged between the receive unit and the transmit unit over a dedicated bus within an SoC.

With the receipt of credits and tokens, available credits and tokens may then be adjusted (block 604). In some embodiments, available credits and tokens may be adjusted dependent upon the received credits and tokens. The number of received tokens may, in various embodiments, be checked against a pre-determined value, and the number of available credits may be reduced in response to a determination that the number of tokens is below the pre-determined value. In some embodiments, separate credits may be used for flow control of command and data packets, and each type of credits may be reduced by differing amounts in response to the determination that the number of tokens is below the pre-determined value.

The number of available credits may then be passed to arbitration logic where a command, data, or a combination thereof may be selected (or scheduled) to be transmitted to a destination (block 605). In some embodiments, the arbitration logic may be included within block logic such as, e.g., block logic 211, as illustrated in FIG. 2. The arbitration logic may be implemented as a general purpose processor executing program instructions to perform the arbitration, or in other embodiments, the arbitration logic may be implement as a dedicated state machine configured to execute a specific arbitration algorithm. In some embodiments, the arbitration logic may employ Shortest Remaining Time, Round Robin, or any other suitable scheduling algorithm.

Once a command or data has been selected for transmission, the number of available credits and tokens may be decremented (block 606). In some embodiments, the transfer of commands or data may require multiple cycles. In such cases, waiting for the intended receiver to update its number of credits may result in additional latency in the credit update capability. Such additional latency may, in various embodiments, allow a transmit unit to send a transaction to a receiver using out of date credit information. To avoid a stall situation, larger buffers may be necessary in receiver units. In some embodiments, the arbitration logic may signal to a transmit unit to decrease the number of available credits, thereby avoiding the aforementioned latency. The number of credits may, in various embodiments, be decreased by a pre-determined amount, such as, e.g., the number of credits for maximum data or command transfer.

The transaction selected by the arbitration logic may then be sent to its destination (block 607). In some embodiments, prior to sending the transaction, it may be encoded in a communication protocol that is supported by the communication bus over which the transaction is to be transmitted. A virtual channel of the communication bus may, in various embodiments, be selected and used to send the selected transaction. In other embodiments, the transaction may be encoded with a QoS indicator.

Once the transaction has been sent, the available credits and tokens may be updated (block 608). In some embodiments, a transaction may take multiple cycles to send. In such cases, the available credits may be speculatively decremented to the timing of transactions on the bus.

It is noted that the operations illustrated in the flowchart of FIG. 6 are depicted as being performed in a sequential fashion. In other embodiments, one or more of the illustrated options may be performed in parallel.

Figure 7:
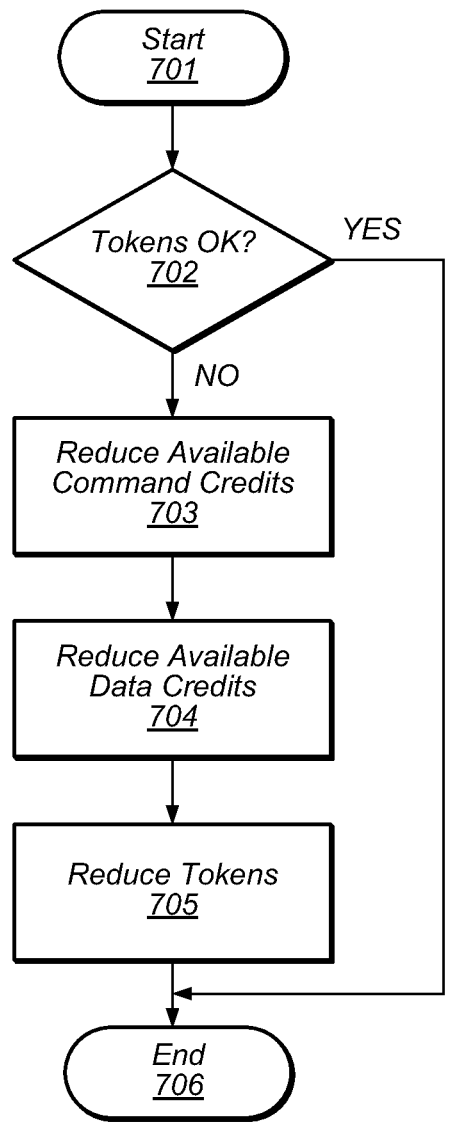
FIG. 7 illustrates a flowchart of an embodiment of a method for adjusting available credits.

An embodiment of a method for adjusting available credits is depicted in the flowchart illustrated in FIG. 7. In some embodiments, the method depicted in FIG. 7 may correspond to the block 604 (adjust available credits) of the method depicted in FIG. 6. The method begins in block 701. The number of tokens currently detected by a transmit unit such as, e.g., transmit unit 300 as illustrated in FIG. 3, may be checked (block 702). In some embodiments, a token check such as, token check circuit 509 as illustrated in FIG. 5B, may be used to perform the check. The number of tokens may, in various embodiments, be checked to determine if the number is greater than or equal to a pre-determined value. In some embodiments, the pre-determined value may be zero. A digital comparator or other suitable circuit may be used to perform the check. When the number of tokens is greater than or equal to the pre-determined value, the method may conclude (block 705).

When the number of tokens is less than the pre-determined value, the available command credits may be reduced (block 703). In some embodiments, the available command credits may be set to zero, while in other embodiments, the available command credits may be set to a pre-determined minimum value. Once the available credits have been reduced, the available credits may be sent to an arbitration circuit within block logic of a functional block, such as, block logic 211, as illustrated in FIG. 2. The reduced available command credits may, in various embodiments, temporarily prevent the arbitration logic from selecting a command to be sent via a transmit unit to a receive unit in another block.

Once the available command credits have been reduced, a similar procedure is applied to data credits (block 704). In some embodiments, the available data credits may be set to zero, while in other embodiments, the available data credits may be set to a pre-determined minimum value. The modified available data credits may then be sent to an arbitration circuit within block logic of a functional block such as, e.g., block logic 211, as illustrated in FIG. 2. In various embodiments, the reduced available data credits may temporarily prevent the arbitration circuit from selecting data to be sent to a receive unit in another functional block via a transmit unit.

Once the both the available command credits and available data credits have been reduced, the number of available tokens may also be reduced. In some embodiments, a counter such as, e.g., token counter 509 of token management circuit 517 as illustrated in FIG. 5B, may be decremented. The reduced number of credits may, in various embodiments, be compared against a pre-determined value. With the reducing of the available tokens complete, the method may conclude in block 706.

It is noted that the method illustrated in FIG. 7 is merely an example. In other embodiments, different operations and different orders of operation are possible and contemplated.

Numerous variations and modifications will become apparent to those skilled in the art once the above disclosure is fully appreciated. It is intended that the following claims be interpreted to embrace all such variations and modifications.

What is claimed is:

1. A local interface unit, comprising:
    a transmit unit coupled to a communication bus, wherein the transmit unit is configured to:
        receive a first one or more credits from a destination receive unit;
        receive a first one or more tokens from the destination receive unit;
        store the first one or more tokens in an asynchronous First-In First-Out (FIFO) dependent upon a first clock signal;
        read the first one or more tokens from the asynchronous FIFO dependent upon a second clock signal, wherein a frequency of the second clock signal is different from a frequency of the first clock signal;
        determine available credits dependent upon the first one or more credits and the first one or more tokens read from the asynchronous FIFO;
        determine available tokens dependent upon the first one or more tokens read from the asynchronous FIFO;
        send the available credits to an arbitration circuit;
        update the available credits responsive to receiving a first transaction selected by the arbitration circuit;
        transmit the first transaction to the destination receive unit using the communication bus;
        update the available credits and the available tokens responsive to the transmission of the first transaction; and
    a receive unit coupled to the communication bus, wherein the receive unit is configure to:
        send a second one or more credits to a source transmit unit;
        send a second one or more tokens to the source transmit unit; and
        receive a second transaction sent on the communication bus by the source transmit unit.

2. The apparatus of claim 1, wherein the transmit unit includes an asynchronous register configured to received the one or more credits.

3. The apparatus of claim 1, wherein the receive unit includes an asynchronous register configured to receive transactions.

4. The apparatus of claim 1, wherein the receive unit includes one or more buffer circuits, wherein each buffer circuit of the one or more buffer circuits is configured to store received transactions.

5. The apparatus of claim 1, wherein the transmit unit includes a counter circuit, wherein the counter circuit is configured to increment in response to each token of the one or more tokens read from the asynchronous FIFO.

6. A method for operating a local interface unit, comprising:
    receiving one or more credits from a receive unit;
    receiving one or more tokens from the receive unit;
    storing the one or more tokens in an asynchronous First-In First-Out (FIFO) dependent upon a first clock signal;
    reading the one or more tokens from the asynchronous FIFO dependent upon a second clock signal, wherein a frequency of the second clock signal is different from a frequency of the first clock signal;
    determining available credits dependent upon the received one or more credits and the one or more tokens read from the asynchronous FIFO;

determining available tokens dependent upon the one or more tokens read from the asynchronous FIFO;

selecting a transaction dependent upon the available credits;

updating the available credits responsive to selecting the transaction;

transmitting the selected transaction to the receive unit; and updating the available credits and the available tokens responsive to transmitting the selected transaction.

7. The method of claim 6, wherein updating the available credits responsive to selecting the transaction comprises reducing the available credits by a pre-determined number of credits.

8. The method of claim 6, wherein updating the available credits responsive to transmitting the selected transaction comprises increasing the available credits.

9. The method of claim 6, wherein determining the available credits comprises:

determining if the received tokens are less than a pre-determined number of tokens; and decreasing the available credits responsive to the determination the received tokens are less than the pre-determined value.

10. The method of claim 6, wherein the receive one or more credits include command credits and data credits.

11. The method of claim 10, wherein selecting a transaction dependent on the available credits comprises:

selecting a command dependent upon available command credits; and selecting data dependent upon available data credits.

12. The method of claim 6, wherein transmitting the selected transaction comprises encoding the selected transaction with a communication protocol.

13. A system, comprising:

a first functional block coupled to a communication bus, wherein the first functional block includes:

an arbitration circuit configured to select a transaction dependent upon available credits; and a transmit unit configured to send the selected transaction on the communication bus; and a second function block coupled to the communication bus, wherein the second function block includes a receive unit configured to:

receive the sent transaction via the communication bus;

send one or more credits to the transmit unit; and send one or more tokens to the transmit unit;

wherein the transmit unit is further configured to:

receive the one or more credits from the receive unit;

receive the one or more tokens from the receive unit;

store the one or more tokens in an asynchronous First-In First-Out (FIFO) dependent upon a first clock signal;

read the one or more tokens from the asynchronous FIFO dependent upon a second clock signal, wherein a frequency of the second clock signal is different from a frequency of the first clock signal;

determine available credits dependent upon the one or more credits and the one or more tokens read from the asynchronous FIFO;

determine available tokens dependent upon the one or more tokens read from the asynchronous FIFO;

send the available credits to the arbitration circuit;

update the available credits responsive to receiving the selected transaction; and update the available credits and the available tokens responsive to sending the selected transaction.

14. The system of claim 13, wherein to receive the one or more credits, the transmit unit is further configured to increment a counter.

15. The system of claim 13, wherein to receive the one or more tokens, the transmit unit is further configured to increment a counter.

16. The system of claim 13, where in the one or more credits include command credits and data credits.

17. The system of claim 13, wherein the communication bus includes one or more virtual channels.

* * * * *